Oct. 20, 1953 P. D. COMERY 2,656,227
COMPENSATING METALLIC THRUST RING
Filed Feb. 1, 1952 2 Sheets-Sheet 1

INVENTOR
P. D. COMERY
PER

ATTORNEY

Oct. 20, 1953 P. D. COMERY 2,656,227
COMPENSATING METALLIC THRUST RING
Filed Feb. 1, 1952 2 Sheets-Sheet 2

INVENTOR
P. D. COMERY
PER

ATTORNEY

Patented Oct. 20, 1953

2,656,227

UNITED STATES PATENT OFFICE 2,656,227

COMPENSATING METALLIC THRUST RING

Peter Dennis Comery, Cooksville, Ontario, Canada, assignor to A. V. Roe Canada Limited, Malton, Ontario, Canada, a corporation Application February 1, 1952, Serial No. 269,513

8 Claims. (Cl. 308—189)

This invention relates to live bearing static mounting assemblies and more particularly to the type requiring self-aligning properties.

In all machinery it is of great importance that the bearings of a common shaft should be accurately aligned and it is desirable that thrust bearings should be capable of accommodating any misalignment caused by minor inaccuracies in the assembly or construction of a machine, distortion due to temperature variation, and the like. Patent No. 2,530,323, dated November 14, 1950, and granted to Winnett Boyd, discloses a thrust bearing which is mounted in a housing supported axially on a body of plastic substantially incompressible material which completely fills a suitably shaped space between the fixed frame of the machine and the housing itself and which is capable of deformation without appreciable decrease in its total volume. However if any deterioration of the material should occur, it will permit axial movement of the shaft and in some applications such movement may be disastrous. Furthermore the manufacture of the body of material presents many difficulties and the material itself may be scarce or economically unobtainable.

The object of this invention is to provide a supporting element which may be substituted for the body of plastic substantially incompressible material used in bearings such as that described in the aforementioned patent or in other types of self-aligning mounting, and which is not readily subject to deterioration or difficult to manufacture. Another object of the invention is to provide a substitute element which is manufactured of materials which are likely to be plentiful and easily obtainable. Other objects and advantages of the invention will be apparent during the course of the following description.

In the accompanying drawings forming a part of this application and in which like numerals are employed to designate like parts throughout the several views.

Figure 1:
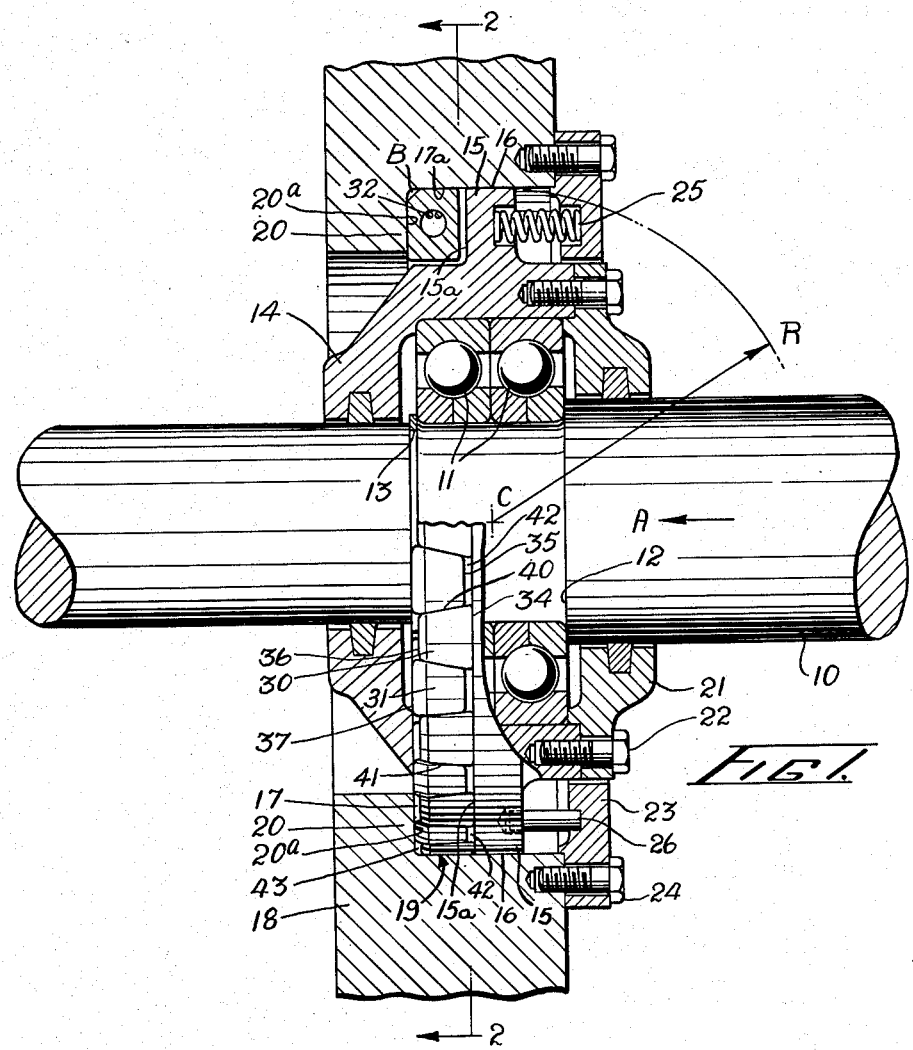
Fig. 1 is a longitudinal section of a bearing assembly showing in side elevation a fragment of supporting element in accordance with the invention.

Fig. 1 depicts a rotatable shaft 10 supported in multiple ball bearings 11. The direction of thrust on the shaft is indicated by the arrow A and the thrust is taken by the shoulder 12 which bears against the side of the inner race of one of the bearings 11. The bearings are retained against this shoulder under conditions of slight reverse load by the circlip 13. The outer races of the bearings are mounted in a housing 14 embodying a flange 15 around its circumference and the outer surface 16 of this flange is an arc having a radius R, the centre C of the said arc being at the point of intersection of the centre line of the flange 15 and the axis of the shaft 10. The housing 14 is shown supported radially in a cylindrical recess 17 in the frame 18, which is a fixed part of the body of the machine; the diameter of the recess 17 is sufficient to accommodate the flange 15, the outer surface 16 of the flange bearing lightly around its periphery against the wall 17a of the recess.

On its thrust face 15a the flange 15 is supported axially on a supporting element 19 which will be described hereinafter and this element is in turn supported axially on a radially disposed supporting surface 20a of a shoulder 20 of the frame 18, the depth of the shoulder being approximately equal to the width of the flange 15.

The housing 14 is covered by an annular closure plate 21 securing the outer race of the bearings 11 and attached to the housing by set screws 22, and the recess in the frame 18 by an annular closure plate 23 secured to the frame by set screws 24; the set screws 22 and 24 are annularly arranged around their respective closure plates. Springs 25 uniformly disposed around the bearing are supported in holes in the flange 15 and in the closure plate 23 and are provided to keep the flange 15 and the shoulder 20 in contact with the supporting element 19 under conditions of slight reverse load. In addition pins 26, fitting loosely in holes in the flange 15 and fitting snugly in the closure plate 23, are provided to prevent the housing 14 from creeping in the direction of rotation of the shaft 10.

Figure 3:
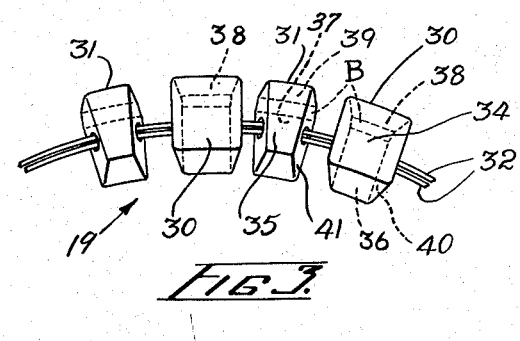
Fig. 3 is a fragmentary exploded view of the supporting element.
Figure 2:
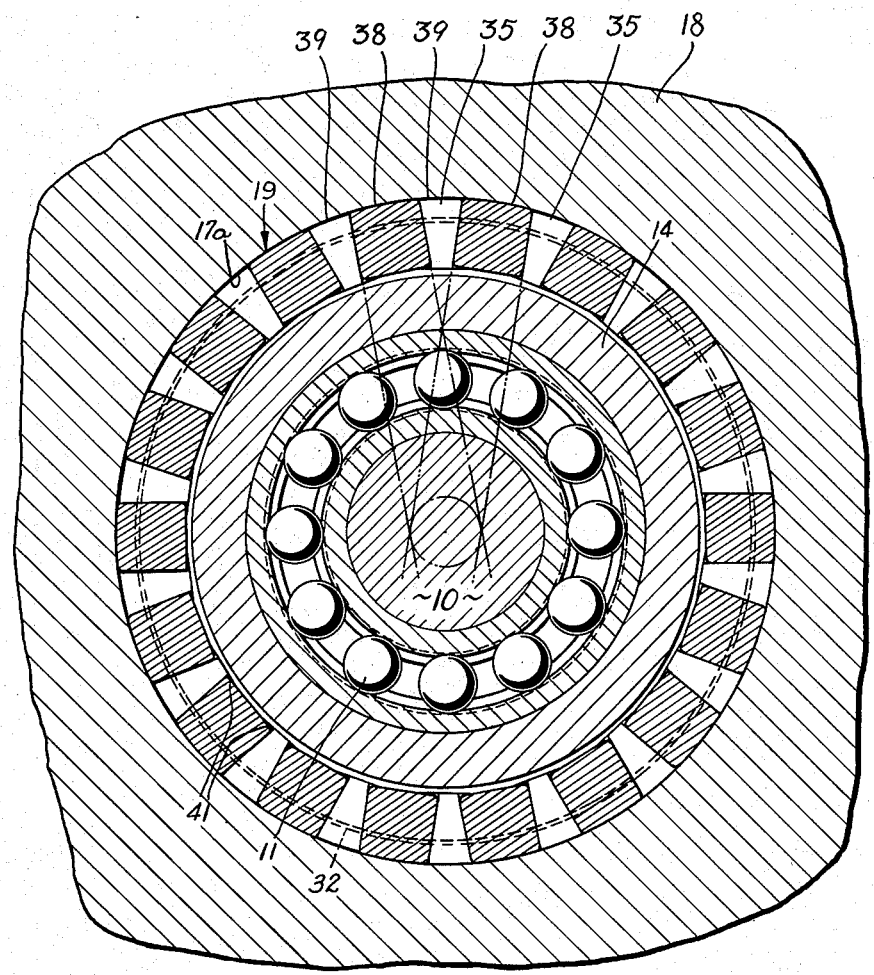
Fig. 2 is a section on the line 2—2 in Fig. 1.

Details of the supporting element 19 are shown in the exploded view, Fig. 3. Two sets of metal blocks 30 and 31 are strung like a bracelet on a ring of wire 32 having overlapping ends after the manner of a split-ring; blocks 30 and 31 are assembled alternately on the wire so that a block 30 is interposed between adjacent blocks 31 around the assembly. The blocks in both series are substantially prismatoidal having upper bases 34 and 35 in planes parallel to their lower bases 36 and 37 respectively (Fig. 1). The terms upper and lower are used in reference to these blocks to denote the bases opposed to the sense of thrust, as indicated by the arrow A, and facing in the sense of thrust, respectively. Each of the blocks 30 is formed so that its upper and lower bases are substantially rectangular while each of the blocks 31 is formed so that its upper and lower bases are tapered, converging towards the centre of the bearing assembly as will be explained hereinafter. The radially outer faces 38 and 39 of the blocks 30 and 31 are slightly curved to conform to the curvature of the peripheral wall 17a of the recess 17. The lateral faces 40 of each block 30 converge from their intersections with the upper base 34 to their intersections with the lower base 36, while the lateral faces 41 of each block 31 diverge from their intersections with the upper base 35 to their intersections with the lower base 37. The angle at which each face 40 intersects the base 34 is equal to the angle at which each face 41 intersects the base 37. The optimum size of each of these angles is 60°. Moreover the bases 35 and 37 of the blocks 31 taper towards the centre of the bearing assembly in such a way that the lateral edges, that is the lines of intersection of the said bases with the lateral faces 41, are tangential to circles about the axis having diameters equal to the tangential widths of the substantially rectangular bases 34 and 36 of the blocks 30, respectively (as indicated in dotted lines on the Fig. 2). It will be clear, therefore, that when the blocks are assembled in contact, with their upper and lower bases parallel, the coacting lateral faces of adjacent blocks will be coplanar.

The wire 32 is threaded through holes traversing the lateral faces 40 and 41, the holes being of materially greater diameter than the wire so that the wire does little more than hold the assembly of the supporting element together before it is inserted in the recess 17. In this condition and when the assembly is placed on a flat surface so that all the upper and lower bases of alternate blocks are in contact with the surface, the assembly has an outside diameter slightly greater than the maximum diameter of the recess 17. When the assembly is inserted in the recess 17, by virtue of the inclined coacting lateral faces 40 and 41, the blocks 30 move in an axial direction in relation to the blocks 31 thereby allowing a reduction in the outside diameter of the assembly to conform to the outside diameter of the recess 17. The wire 32 having a slight resiliency tends to urge the blocks outwardly so that the radially outer faces 38 and 39 are held lightly in contact with the peripheral wall 17a of the recess 17 even when there is no axial load on the assembly. (To accommodate the customary radius between the surface 20a of the shoulder 20 and the peripheral wall 17a of the recess 17, the circumferentially disposed intersections between the bases 36 and the faces 38 of the blocks 30 and between the bases 37 and the faces 39 of the blocks 31 may conveniently be relieved as indicated at B on Fig. 1.) When the bearing assembly is complete the bases 34 of the blocks 30 are in engagement with the thrust face 15a of the flange 15 and the bases 37 of the blocks 31 are in engagement with the supporting surface 20a of the shoulder 20 but clearances 42 and 43 exist between the bases 35 and the surface 15a and the bases 36 and the surface 20a respectively.

Thrust or compressive load is transmitted from the shaft 10 directly through the bearings 11 to the housing 14 and thence through the flange 15 and the supporting element 19 to the frame 18 of the machine. Under the influence of the load each block of the supporting element is urged, like a wedge, between the inclined lateral faces of adjacent blocks, thereby tending to increase the circumferential length of the element. However the wall 17a of the recess 17 confines the supporting element against expansion in a direction at right angles to the direction of the compressive load. Any small misalignment between the axis of the shaft 10 and the axis of the frame 18 is absorbed by deformation of the supporting element 19, the clearances 42 and 43 on one side of the bearing assembly being reduced while the corresponding clearances on the diametrically opposite side of the assembly are increased, by a sliding action between the faces 40 and 41 of adjacent blocks and a circumferential displacement, semi-circularly progressively from block to block around the supporting element.

It will be understood that the dimensions of the clearances 42 and 43 when the entire assembly is properly aligned are of importance in determining the scope of misalignment which the assembly can accommodate and, in conjunction with the axial lengths of the blocks 30 and 31, determine the axial location of the shaft 10 relative to the frame 18. It is, therefore, important that these clearances should be initially set with considerable accuracy and this can be achieved by grinding the bases 34 or 37 of a few of the blocks located at evenly spaced positions around the element.

Normally if the element is grease-packed during assembly no subsequent lubrication is necessary for a considerable period of operation. It is desirable, however, that the blocks 30 and 31 should be made of dissimilar materials, such as bronze and steel, as a precaution against seizing.

It is to be understood that the form of the invention herewith shown and described is to be taken as a typical application of the same and that similar arrangements of blocks having inclined coacting faces may be applied to many forms of live bearing or static mounting where a floating effect to accommodate variations of alignment is desirable. Various changes in the shape, size and arrangement of the parts may therefore be resorted to without departing from the scope of the subjoined claims.

What I claim as my invention is:

1. A self-aligning bearing having two opposed surfaces, a supporting element between the surfaces for transmitting a compressive load, the supporting element comprising a plurality of blocks, at least one of the blocks being in engagement with one of the surfaces and spaced from the other surface, the said one block having opposite faces inclined to the direction of the compressive load and making sliding contact with adjacent blocks at the said inclined faces, the adjacent blocks being in engagement with the other surface and spaced from the one surface, and means confining the element against expansion in a direction at right angles to the direction of the compressive load.

2. A self-aligning bearing having two opposed surfaces, a supporting element between the surfaces for transmitting a compressive load, the supporting element comprising a plurality of blocks, at least one of the blocks being in engagement with one of the surfaces and spaced from the other surface, the said one block having plane opposite faces converging in the direction of the compressive load, the blocks adjacent the said one block having plane inclined faces coplanar and in slidable contact with the converging faces, the adjacent blocks being in engagement with the other surface and spaced from the one surface, and means confining the element against expansion in a direction at right angles to the direction of the compressive load.

3. A self-aligning bearing having two opposed surfaces, an element between the surfaces for transmitting a compressive load, a wall substantially parallel to the direction of the compressive load and forming with one of the surfaces a recess in which the element is situated, the element comprising a plurality of blocks in slidable contact with the wall, each block having opposite converging faces making slidable contact with adjacent blocks, alternate blocks each being in engagement with one of the surfaces and spaced from the other surface, the adjacent blocks being in engagement with said other surface and spaced from said one surface.

4. A self-aligning bearing having two opposed surfaces, an element between the surfaces for transmitting a compressive load, a wall substantially parallel to the direction of the compressive load and forming with one of the surfaces a cylindrical recess in which the element is situated, the element comprising a plurality of blocks arranged annularly in engagement with the said wall, alternate blocks each being in engagement with one of the surfaces and spaced from the other surface, and making slidable contact with adjacent blocks at opposite faces converging towards the said other surface, the said adjacent blocks being in engagement with the said other surface and spaced from the said one surface.

5. A self-aligning bearing having two opposed surfaces, an element between the surfaces for transmitting a compressive load, a wall substantially parallel to the direction of the compressive load and forming with one of the surfaces a cylindrical recess in which the element is situated, the element comprising a plurality of substantially prismatoidal blocks arranged annularly in engagement with the said wall, each alternate block having a base in engagement with one of the surfaces and a base spaced from the other surface, and having substantially radially disposed lateral faces converging towards the other surface, the said converging faces engaging similarly disposed lateral faces of adjacent blocks, each of the adjacent blocks having a base in engagement with the said other surface and a base spaced from the said one surface.

6. A thrust bearing assembly comprising a shaft housing, a machine frame having a recess in which the housing is mounted, the recess being bounded by a wall substantially parallel to the direction of thrust and an annular shoulder disposed transversely of the said direction, a supporting element situated in the recess and interposed between the housing and the shoulder, the said element comprising a plurality of blocks arranged annularly upon the said shoulder, alternate blocks being in engagement with the shoulder and spaced from the housing, and making slidable contact with adjacent blocks at opposite faces converging towards the housing, the said adjacent blocks being in engagement with the said housing and spaced from the said shoulder, means for maintaining the radial dimensions of the annular element, and means for holding the housing and the shoulder in engagement with the supporting element under conditions of slight reverse load.

7. A thrust bearing assembly comprising a shaft housing, a machine frame having a recess in which the housing is mounted, the recess being bounded by a wall substantially parallel to the direction of thrust and an annular shoulder disposed transversely of the said direction, a supporting element situated in the recess and interposed between the housing and the shoulder, the said element comprising a plurality of blocks arranged annularly upon the said shoulder, alternate blocks being in engagement with the shoulder and spaced from the housing, and making slidable contact with adjacent blocks at opposite faces converging towards the housing, the said adjacent blocks being in engagement with the said housing and spaced from the said shoulder, means urging the blocks into engagement with the said wall, means for holding the housing from rotating relative to the frame, and means for holding the housing and the shoulder in engagement with the supporting element under conditions of slight reverse load.

8. A thrust bearing assembly comprising a shaft housing, a machine frame having a cylindrical recess in which the housing is mounted, the recess being bounded by a wall substantially parallel to the direction of thrust and an annular shoulder disposed transversely of the said direction, the housing having a bearing surface in contact with the wall, the bearing surface being convex to permit angular inclination of the shaft housing relative to the frame, a supporting element situated in the recess and interposed between the housing and the shoulder, the said element comprising a plurality of substantially prismatoidal blocks arranged annularly in engagement with the said wall, each alternate block having a base in engagement with the shoulder and a base spaced from the housing, and having lateral faces converging towards the housing and coplanar with the lateral faces of adjacent blocks, each of the adjacent blocks having a base in engagement with the housing and a base spaced from the shoulder, means for holding the housing from rotating relative to the frame, and means for holding the housing and the shoulder in engagement with the supporting element under conditions of slight reverse load.

PETER DENNIS COMERY.

References Cited in the file of this patent

UNITED STATES PATENTS

| Number | Name | Date |
|---|---|---|
| 2,530,323 | Boyd | Nov. 14, 1950 |